United States Patent
Yamauchi et al.

(10) Patent No.: US 6,680,002 B2
(45) Date of Patent: Jan. 20, 2004

(54) LIQUID CRYSTALLINE POLYESTER RESIN COMPOSITION FOR A CONNECTOR

(75) Inventors: Hiroyasu Yamauchi, Tsukuba (JP); Satoshi Okamoto, Tsukuba (JP); Satoshi Nagano, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/357,334

(22) Filed: Feb. 4, 2003

(65) Prior Publication Data

US 2003/0168634 A1 Sep. 11, 2003

(30) Foreign Application Priority Data

Feb. 25, 2002 (JP) ........................................ 2002-047706

(51) Int. Cl.7 ............................................... C09K 19/52
(52) U.S. Cl. ................................... 252/299.01; 525/7.1
(58) Field of Search ................... 252/299.01, 299.6, 252/299.61, 299.62, 299.63, 299.64, 299.68; 428/1.2; 523/1, 500, 522, 526; 525/7, 7.1, 11, 25, 26

(56) References Cited

U.S. PATENT DOCUMENTS 5,804,634 A 9/1998 Umetsu et al.
5,976,406 A 11/1999 Nagano et al.

FOREIGN PATENT DOCUMENTS

| EP | 1 243 620 A1 | 9/2002 |
| JP | 08-231832 A | 9/1996 |
| JP | 09-302203 A | 11/1997 |
| JP | 10-30052 A | 2/1998 |
| JP | 10-219085 A | 8/1998 |
| JP | 2000-178443 A | 6/2000 |
| JP | 2001-106923 A | 4/2001 |

*Primary Examiner*—Mark F. Huff
*Assistant Examiner*—Jennifer R. Sadula
(74) *Attorney, Agent, or Firm*—Sughrue Mion, PLLC

(57) ABSTRACT

The object of the present invention is to provide a liquid crystalline polyester resin composition for connectors that is excellent in fluidity at the time of molding and is therefore capable of producing connectors with further suppressed degree of warpage. The object is achieved by providing a liquid crystalline polyester resin composition for connectors comprising a liquid crystalline polyester resin mixture which comprises a liquid crystalline polyester (A) having a specific flow beginning temperature and a liquid crystalline polyester resin (B) having a specific flow beginning temperature and the flow beginning temperature between the liquid crystalline polyester resin (A) and the liquid crystalline polyester resin (B) is from 20° C. to 60° C., and from 15 to 180 parts by weight of a fibrous and/or plate-shaped inorganic filler; wherein both of the liquid crystalline polyester resin (A) and the liquid crystalline polyester resin (B) are produced by the specific method.

9 Claims, 1 Drawing Sheet us 6,680,002 B2

LIQUID CRYSTALLINE POLYESTER RESIN COMPOSITION FOR A CONNECTOR

FIELD OF THE INVENTION

The present invention relates to a liquid crystalline polyester resin composition for a connector.

BACKGROUND OF THE INVENTION

A liquid crystalline polyester resin is excellent in melt fluidity and heat resistance since its molecules are so rigid that it is not to be entangled even in the melted state and its molecular chains are remarkably oriented in the flow direction by shearing at the time of molding and are kept in the oriented state even at the time of solidification.

Therefore, a molded article obtained by using a resin composition containing a liquid crystalline polyester resin mixed with fibrous reinforcing materials such as glass fiber, inorganic fillers such as talc, and the like has been preferably used for applications to electronic parts such as connectors having thin portions and complicated shapes. However, along with the advancement of surface mounting technology and the preference of lightness, thinness, shortness, and compactness of mobile appliances such as a mobile phone and the like, the requirements for connectors to be made thin and suppressed from warping have become intensive. In order to make connectors thin and suppressing warpage of molded article, various investigations regarding fillers to be mixed have been carried out.

For example, JP10-219085A discloses that use of a resin composition containing a resin mixture obtained by mixing two types of liquid crystalline polyesters having different flow beginning temperatures and inorganic fillers makes it possible to produce connectors excellent in the fluidity at the time of molding and having suppressed its warpage.

However, since connectors are required to be extremely thin, it has been desired to develop a resin composition that has further improved fluidity at the time of molding and is therefore capable of producing connectors with further suppressed degree of warpage.

SUMMARY OF THE INVENTION

The object of the present invention is to provide a liquid crystalline polyester resin composition for connectors that is excellent in fluidity at the time of molding and is therefore capable of producing connectors with further suppressed degree of warpage.

Inventors of the present invention have enthusiastically made investigations to find a liquid crystalline polyester resin composition for connectors free from such problems described above and consequently found that a resin composition obtained by mixing an inorganic filler with a mixture of liquid crystalline polyester resins obtained by acylation, ester exchange or both acylation and ester exchange in the presence of a heterocyclic organic basic compound having two or more nitrogen atoms is excellent in fluidity at the time of molding and has suppressed degree of warpage of a molded article and therefore is suitably applicable to connectors and finally inventors have completed the invention.

That is, the present invention provides a liquid crystalline polyester resin composition for connectors comprising 100 parts by weight of a liquid crystalline polyester resin mixture which comprises 100 parts by weight of a liquid crystalline polyester (A) having a flow beginning temperature of from 300° C. to 400° C. and from 10 to 150 parts by weight of a liquid crystalline polyester resin (B) having a flow beginning temperature of from 260° C. to 350° C. and the difference between the flow beginning temperature of the liquid crystalline polyester resin (A) and the flow beginning temperature of the liquid crystalline polyester resin (B) is from 20° C. to 60° C., and from 15 to 180 parts by weight of a fibrous and/or plate-shaped inorganic filler; wherein both of the liquid crystalline polyester resin (A) and the liquid crystalline polyester resin (B) are produced by ester exchange reaction between at least one selected from a group consisting of aromatic dicarboxylic acids and aromatic hydroxycarboxylic acids, and an acylated compound obtained by acylation of phenolic hydroxyl group of at least one selected from a group consisting of aromatic diols and aromatic hydroxycarboxylic acids with a fatty acid anhydride, and at least one of the acylation and the ester exchange reaction is carried out in the presence of a heterocyclic organic basic compound having two or more nitrogen atoms.

DETAILED DESCRIPTION OF THE INVENTION

Figure 1:
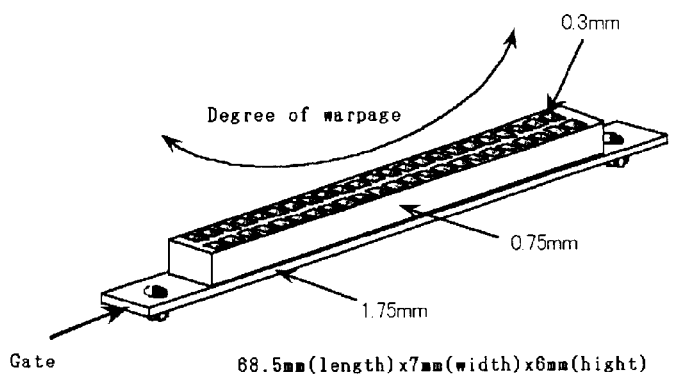
FIG. 1: A perspective view of the connector

Both liquid crystalline polyester resin (A) and liquid crystalline polyester resin (B) used for the present invention are produced by ester exchange reaction of condensation polymerization between an acylated compound obtained by acylation of phenolic hydroxyl groups of at least one selected from a group consisting of aromatic diols and aromatic hydroxycarboxylic acids with a fatty acid anhydride, and at least one selected from a group consisting of aromatic dicarboxylic acids and aromatic hydroxycarboxylic acids. In this reaction, either the acylation or the ester exchange reaction, or both of two is carried out in the presence of a heterocyclic organic basic compound having two or more nitrogen atoms.

Acylation of the phenolic hydroxyl groups of aromatic diols, aromatic hydroxycarboxylic acids, or a mixture of aromatic diols and aromatic hydroxycarboxylic acids with fatty acid anhydride will be described.

The aromatic diols may include, for example, 4,4'-dihydroxybiphenyl, hydroquinone, resorcin, methylhydroquinone, chlorohydroquinone, acetoxyhydroquinone, nitrohydroquinone, 1,4-dihydroxynaphthalene, 1,5-dihydroxynaphthalene, 1,6-dihydroxynaphthalene, 2,6-dihydroxynaphthalene, 2,7-dihydroxynaphthalene, 2,2-bis(4-hydroxyphenyl)propane, 2,2-bis(4-hydroxy-3,5-dimethylphenyl)propane, 2,2-bis(4-hydroxy-3,5-dichlorophenyl)propane, 2,2-bis(4-hydroxy-3-methylphenyl)propane, 2,2-bis(4-hydroxy-3-chlorophenyl)propane, bis(4-hydroxyphenyl)methane, bis(4-hydroxy-3,5-dimethylphenyl)methane, bis(4-hydroxy-3,5-dichlorophenyl)methane, bis(4-hydroxy-3,5-dibromophenyl)methane, bis(4-hydroxy-3-methylphenyl)methane, bis(4-hydroxy-3-chlorophenyl)methane, 1,1-bis(4-hydroxyphenyl)cyclohexane, bis-(4-hydroxyphenyl)ketone, bis-(4-hydroxy-3,5-dimethylphenyl)ketone, bis-(4-hydroxy-3,5-dichlorophenyl)ketone, bis-(4-hydroxyphenyl)sulfide, bis-(4-hydroxyphenyl)sulfone and the like. They may be used alone or in combination of two or more of them.

Among them, 4,4'-dihydroxybiphenyl, hydroquinone, resorcin, 2,6-dihydroxynaphthalene, 2,2-bis(4- hydroxyphenyl)propane, bis-(4-hydroxyphenyl)sulfone are easily available and therefore preferable, and 4,4'-dihydroxybiphenyl is further preferable to be used.

The aromatic hydroxycarboxylic acid may include, for example, p-hydroxybenzoic acid, m-hydroxybenzoic acid, 2-hydroxy-6-naphthoic acid, 2-hydroxy-3-naphthoic acid, 1-hydroxy-4-naphthoic acid, 4-hydroxy-4'-carboxydiphenyl ether, 2,6-dichloro-p-hydroxybenzoic acid, 2-chloro-p-hydroxybenzoic acid, 2,6-difluoro-p-hydroxybenzoic acid, 4-hydroxy-4'-biphenylcarboxylic acid and the like. They may be used alone or in combination of two or more of them.

Among them, p-hydroxybenzoic acid, 2-hydroxy-6-naphthoic acid are easily available and therefore preferable and p-hydroxybenzoic acid is further preferable to be used.

The fatty acid anhydride may include, for example, acetic anhydride, propionic anhydride, butyric anhydride, isobutyric anhydride, valeric anhydride, pivalic anhydride, 2-ethylhexanoic anhydride, monochloroacetic anhydride, dichloroacetic anhydride, trichloroacetic anhydride, monobromoacetic anhydride, dibromoacetic anhydride, tribromoacetic anhydride, monofluoroacetic anhydride, difluoroacetic anhydride, trifluoroacetic anhydride, glutaric anhydride, maleic anhydride, succinic anhydride, β-bromopropionic anhydride, and the like, however it is not particularly limited. These compounds may be used in form of a mixture of two or more of them. In terms of the cost and handling easiness, acetic anhydride, propionic anhydride, butyric anhydride, and isobutyric anhydride are preferable to be used and acetic anhydride is further preferable to be used.

The amount used of the fatty acid anhydride is preferably from 1.0 to 1.2, more preferably from 1.0 to 1.15, further more preferably from 1.03 to 1.12, and most preferably from 1.05 to 1.1 times equivalent to the phenolic hydroxyl groups of aromatic diols, aromatic hydroxycarboxylic acids or a mixture of the aromatic diols and the aromatic hydroxycarboxylic acids.

When the amount used of the fatty acid anhydride is less than 1.0 time equivalent, it may occur that the equilibrium of the acylation reaction is shifted to the fatty acid anhydride side and unreacted aromatic diols or aromatic dicarboxylic acids may be sublimated at the time of polymerization to polyesters and the reaction system is clogged. When it exceeds 1.2 times equivalent, coloration of the obtained liquid crystalline polyester may be signification.

The acylation reaction is carried out preferably at from 130° C. to 180° C. and more preferably at 140° C. to 160° C. The reaction time is preferably from 30 minutes to 20 hours, more preferbly from 1 hour to 5 hours.

Next, ester exchange reaction of the acylated compound thus obtained above with aromatic dicarboxylic acids, aromatic hydroxycarboxylic acids or the mixture of aromatic dicarboxylic acids and aromatic hydroxycarboxylic acids will be described.

The aromatic dicarboxylic acids used for the ester exchange reaction of the present invention may include, for example, terephthalic acid, isophthalic acid, 2,6-naphthalenedicarboxylic acid, 1,5-naphthalenedicarboxylic acid, 4,4'-biphenyldicarboxylic acid, methylterephthalic acid, methylisophthalic acid, diphenyl ether-4,4'-dicarboxylic acid, diphenylsulfone-4,4'-dicarboxylic acid, diphenylketone-4,4'-dicarboxylic acid, 2,2'-diphenylpropane-4,4'-dicarboxylic acid, and the like. They may be used alone or in combination of two or more of them.

Among them, terephthalic acid, isophthalic acid, a mixture of terephthalic acid and isophthalic acid, and 2,6-naphthalenedicarboxylic acid are easily available and therefore preferable. Terephthalic acid, isophthalic acid and a mixture of terephthalic acid and isophthalic acid are more preferable to be used.

The aromatic hydroxycarboxylic acids to be used for the ester exchange reaction can be exemplified those described above.

The amount used of the aromatic dicarboxylic acids, the aromatic hydroxycarboxylic acids, or the mixture of the aromatic dicarboxylic acids and the aromatic hydroxycarboxylic acids is preferably from 0.8 to 1.2 times the equivalent to the acylated compound.

The ester exchange (of condensation polymerization) reaction is carried out preferably in a temperature range of 130 to 400° C. with increasing the temperature at 0.1 to 50° C./min speed and more preferably in a temperature range of 150 to 350° C. with increasing the temperature at 0.3 to 5° C./min speed.

After the ester exchange (of condensation polymerization) reaction, solid phase polymerization may be carried out in order to improve various physical properties. The solid phase polymerization is preferable to be carried out in the conditions of the increasing speed of the polymerization temperature and the treatment temperature in which the resin is not bonded by fusion. And it is made possible to obtain a liquid crystalline polyester resin with a desired flow beginning temperature by changing the final treatment temperature $T_f$. For example, in the case of a liquid crystalline polyester resin having a flow beginning temperature of A° C., temperature $T_f$ may be controlled to be from (A-30)° C. to (A-60)° C.

When the ester exchange reaction of the fatty acid esters obtained by acylation and carboxylic acids is carried out, in order to shift the equilibrium, the fatty acids produced as byproducts and unreacted fatty acid anhydrides are preferable to be removed by distillation from the reaction system.

Further, some of the distilled and removed fatty acids maybe refluxed and turned back to a reactor, so that evaporating or sublimating raw materials accompanied with fatty acids can be condensed or solidified to be turned back to the reactor. In this case, the precipitated carboxylic acids may be turned back to the reactor together with the fatty acids.

In the present invention, the acylation, the ester exchange reaction, and both acylation and ester exchange reaction are carried out in the presence of a heterocyclic organic basic compound having two or more nitrogen atoms.

The heterocyclic organic basic compound having two or more nitrogen atoms may include, for example, an imidazole compound, a triazole compound, a dipyridyl compound, a phenanthroline compound, a diazaphenanethroline compound, 1,5-diazabicyclo[4.3.0]non-5-ene, 1,4-diazabicyclo[2.2.2]octane, 1,8-diazabicyclo[5.4.0]undec-7-ene, N,N-dimethylaminopyridine and the like.

Imidazole compounds defined by the formula (1) are preferable used.

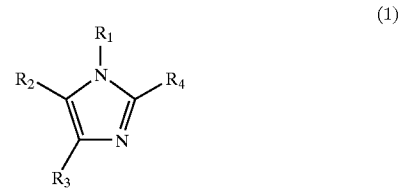

(1)

In the formula, $R_1$ to $R_4$ independenly represent hydrogen atom, an alkyl with 1 to 4 carbons, hydroxymethyl, cyano, a cyanoalkyl with 2 to 5 carbons, a cyanoalkoxyl with 2 to 5 carbons, carboxyl, amino, an aminoalkyl with 1 to 4 carbons, an aminoalkoxy with 1 to 4 carbons, phenyl, benzyl, phenylpropyl or formyl.

Examples of the imidazole compound defined by the formula (1) are imidazole, 1-methylimidazole, 2-methylimidazole, 4-methylimidazole, 1-ethylimidazole, 2-ethylimidazole, 4-ethylimidazole, 1,2-dimethylimidazole, 1,4-dimethylimidazole, 2,4-dimethylimidazole, 1-methyl-2-ethylimidazole, 1-methyl-4-ethylimidazole, 1-ethyl-2-methylimidazole, 1-ethyl-2-ethylimidazole, 1-ethyl-2-phenylimidazole, 2-ethyl-4-methylimidazole, 2-phenylimidazole, 2-undecylimidazole, 2-heptadecylimidazole, 1-benzyl-2-methylimidazole, 2-phenyl-4-methylimidazole, 1-cyanoethyl-2-methylimidazole, 1-cyanoethyl-2-phenylimidazole, 4-cyanoethyl-2-ethyl-4-methylimidazole, 1-aminoethyl-2-methylimidazole, 1-(cyanoethylaminoethyl)-2-methylimidazole, N-[2-(2-methyl-1-imidazolyl)ethyl]urea, 1-cyanoethyl-2-undecylimidazole, 1-cyanoethyl-2-methylimidazole trimellitate, 1-cyanoethyl-2-phenylimidazole trimellitate, 1-cyanoethyl-2-ethyl-4-methylimidazole trimellitate, 1-cyanoethyl-2-undecylimidazole trimellitate, 2,4-diamino-6-[2'-methylimidazolyl-(1')]-ethyl-S-triazine, 2,4-diamino-6-[2'-undecylimidazolyl(-(1'))ethyl-S-triazine], 2,4-diamino-6-[2-ethyl-4-methylimidazolyl-(1')]-ethyl-S-triazine, 1-dodecyl-2-methyl-3-benzylimidazolium chloride, N,N'-bis(2-methyl-1-imidazolylethyl)urea, N,N'-(2-methyl-1-imidazolylethyl)adipoamide, 2,4-dialkylimidazole-dithiocarboxylic acid, 1,3-dibenzyl-2-methylimidazolium chloride, 2-phenyl-4-methyl-5-hydroxymehtylimidazole, 2-phenyl-4,5-dihydroxymethylimidazole, 1-cyanoethyl-2-phenyl-4,5-bis(cyanoethoxymethyl)imidazole, 2-methylimidazole isocyanuric acid adduct, 2-phenylimidazole isocyanuric acid adduct, 2,4-diamino-6-[2'-methylimidazolyl-(1')]ethyl-S-triazine isocyanuric acid adduct, 2-alkyl-4-formylimidazole, 2,4-dialkyl-5-formylimidazole, 1-benzyl-2-phenylimidazole, imidazole-4-dithiocarboxylic acid, 2-methylimidazole-4-dithiocarboxylic acid, 2-undecylimidazole-4-dithiocarboxylic acid, 2-heptadecylimidazole-4-dithiocarboxylic acid, 2-phenylimidazole-4-dithiocarboxylic acid, 4-methylimidazole-5-dithiocarboxylic acid, 4-dimethylimidazole-5-dithiocarboxylic acid, 2-ethyl-4-methylimidazole-5-dithiocarboxylic acid, 2-undecyl-4-methylimidazole-5-dithiocarboxylic acid, 2-phenyl-4-methylimidazole-5-dithiocarboxylic acid, 1-aminoethyl-2-methylimidazole, 1-(cyanoethylaminoethyl)-2-methylimidazole, N-(2-methylimidazole-1-ethyl)urea, N,N'-[2-methylimidazolyl(1)-ethyl]-adipoyldiamide, 1-aminoethyl-2-ethylimidazole, 4-formylimidazole, 2-methyl-4-formylimidazole, 4-methyl-5-formylimidazole, 2-ethyl-4-methyl-5-formylimidazole, 2-phenyl-4-methyl-4-formylimidazole and the like.

The triazole compound may include, for example, 1,2,4-triazole, 1,2,3-triazole, benzotriazole and the like.

The dipyridyl compound may include, for example, 2,2'-dipyridyl, 4,4'-dipyridyl and the like.

The phenanthroline compound may include, for example, pyrimidine, purine, 1,7-phenanthroline, 1,10-phenanthroline and the like.

The diazaphenanthroline may include, for example, pyridazine, triazine, pyrazine, 1,8-diazaphenanethroline and the like.

As the heterocyclic organic basic compound having two or more nitrogen atoms, from a viewpoint of reactivity, imidazole compounds represented by the formula (1) are preferable and from a viewpoint of color tone of the obtained liquid crystalline polyester resin and molded article such as connector, imidazole compounds defined by the formula (1) in which R1 is an alkyl having 1 to 4 carbons and R2 to R4 are hydrogen atoms, respectively, are more preferable and 1-methylimidazole and 1-ethylimidazole

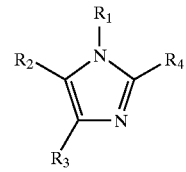

(1)

are most preferable from a viewpoint of their easy availability.

The addition amount of the heterocyclic organic basic compound having two or more nitrogen atoms is preferably 0.005 to 1 part by weight, more preferably 0.05 to 0.5 parts by weight from the viewpoint of color tone and productivity of liquid crystalline polyester resin, to 100 parts by weight in total of aromatic dicarboxylic acids, aromatic diols, and aromatic hydroxycarboxylic acids to be used as raw material.

If the additional amount is less than 0.005 parts by weight, the effect for improving the impact strength or the like may not be significant and if it exceeds 1 part by weight, the reaction control may become difficult.

The heterocyclic organic basic compound having two or more nitrogen atoms may exist for a moment during acylation, ester exchange reaction, or both acylation and ester exchange reaction, and the time of the addition is not particularly limited and therefore, it may be added immediately before the reaction starting or during the reaction.

Especially, a liquid crystalline polyester resin obtained by carrying out ester exchange reaction at 300° C. or higher after adding a heterocyclic organic basic compound having two or more nitrogen atom exhibits excellent fluidity in the molding process.

For the purpose to increase the polymerization speed by promoting the ester exchange reaction, a slight amount of a catalyst may be added. The catalyst to be added may include, for example, a germanium compound such as germanium oxide, a tin compound such as stannous oxalate, stannous acetate, dialkyl tin oxide, diaryl tin oxide and the like, a titanium compound such as titanium dioxide, titanium alkoxide, alkoxytitanium silicate, and the like, an antimony oxide such as antimony trioxide, an organic acid metal salt such as sodium acetate, potassium acetate, calcium acetate, zinc acetate, ferrous acetate and the like, a Lewis acid such as trifluoroboron, aluminum chloride and the like, an amine, an amide, and an inorganic acid such as hydrochloric acid, sulfuric acid and the like.

The acylation reaction and the ester exchange (of condensation polymerization) reaction may be carried out by using, for example, a batch type apparatus, a continuous type apparatus and the like.

The liquid crystalline polyester resins (A) and (B) obtained as described above are polyesters called as thermotropic liquid crystalline polymers and include:

(1) a polymer comprising aromatic hydroxycarboxylic acids, aromatic dicarboxylic acids and an aromatic diols, (2) a polymer comprising different aromatic hydroxycarboxylic acids, (3) a polymer comprising aromatic dicarboxylic acids and aromatic diols, (4) a polymer prepared by reaction of polyesters such as polyethylene terephthalate and aromatic hydroxycarboxylic acids; and the like and form anisotropic melt phase at a temperature of 400° C. or lower. It is noted that in place of such aromatic hydroxycarboxylic acids, aromatic dicarboxylic acids or aromatic diols, ester formable derivatives thereof may be used.

As the structural repeating units of the liquid crystalline polyester resins, the following can be exemplified, however, they are not limited to these examples.

The structural repeating units derived from aromatic hydroxycarboxylic acids:

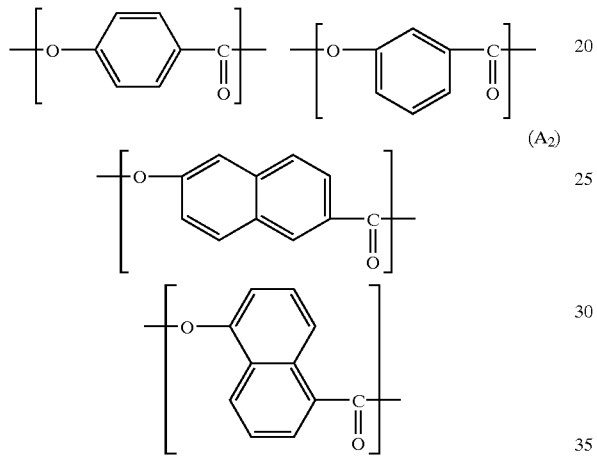

(the structural repeating units exemplified above may have substituents of halogen atoms and alkyl groups.)

The structural repeating units derived from aromatic dicarboxylic acids:

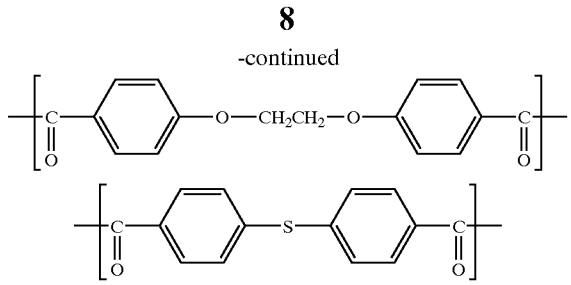

(the structural repeating units exemplified above may have substituents of halogen atoms and alkyl groups.)

The structural repeating units derived from aromatic diols:

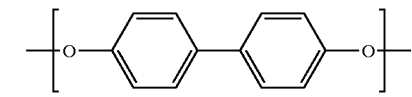
(C$_1$)

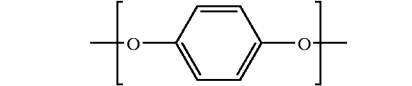
(C$_2$)

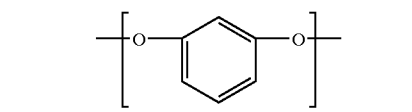
(C$_3$)

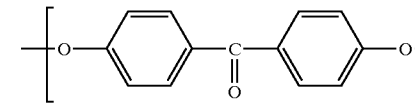

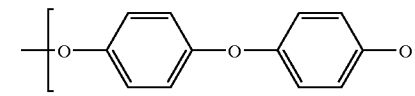

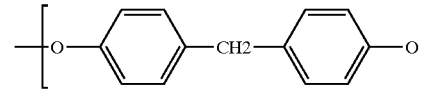

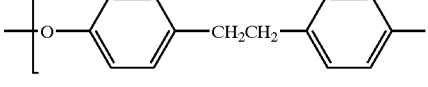

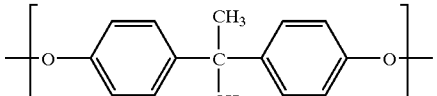
(C$_5$)

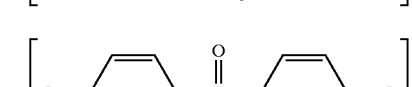
(C$_6$)

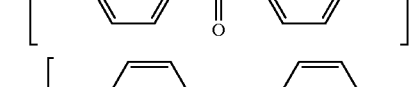

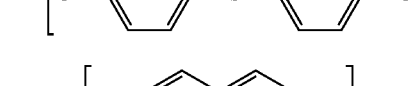

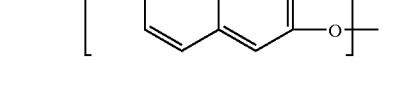
(C$_4$)

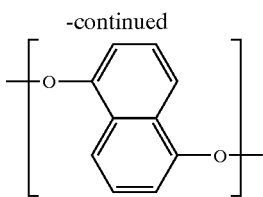

From a viewpoint of good balance of heat resistance, mechanical characteristics, and processibility, preferable is a liquid crystalline polyester resins containing at least 30% of the structural repeating unit defined by the above-described formula $A_1$.

(the structural repeating units exemplified above may have substituents of halogen atoms and alkyl groups.)

Those having combinations of the structural repeating units as following (a) to (f) are preferable.

- (a): a combination of $(A_1)$, $(B_1)$ and $(C_1)$, or a combination of $(A_1)$, a mixture of $(B_1)$ and $(B_2)$, and $(C_1)$,
- (b): a combination of $(A_1)$ and $(A_2)$,
- (c): the same combination as (a) expect partly replacing $(A_1)$ with $(A_2)$,
- (d): the same combination as (a) expect partly replacing $(B_1)$ with $(B_3)$,
- (e): the same combination as (a) expect partly replacing $(C_1)$ with $(C_3)$, and
- (f): the combination of $(A_1)$, $(A_2)$, $(B_1)$ and $(C_2)$.

Further, as the liquid crystalline polyester resins used for the present invention, preferable ones are those comprising a structural repeating unit (I) derived from p-hydroxybenzoic acid, a structural repeating unit (II) derived from 4,4'-dihydroxybiphenyl, a structural repeating unit (III) derived from terephthalic acid, and a structural repeating unit (IV) derived from isophthalic acid in a mole ratio of II/I in a range of 0.2 to 1.0, a mole ratio of (III+IV)/II in a range of 0.9 to 1.1, and a mole ratio of IV/III in a range not lower than 0 to not higher than 1. Further, $\alpha/\beta$ is preferably in the range of 0.1 to 0.6, wherein a is the mole ratio of IV/III of liquid crystalline polyester resin (A) and $\beta$ is the mole ratio of IV/III of liquid crystalline polyester resin (B).

For the present invention, a liquid crystalline polyester resin mixture comprising a liquid crystalline polyester resin (A) having a flow beginning temperature defined as following in a range of 300° C. to 400° C. and a liquid crystalline polyester resin (B) having a flow beginning temperature in a range of 260° C. to 350° C. with the difference of 20° C. to 60° C. difference of the flow beginning temperature of the liquid crystalline polyester resin (A) from the flow beginning temperature of the liquid crystalline polyester resin (B) is used. In the present invention, the flow beginning temperature of the liquid crystalline polyester resin (B) is lower that that of the liquid crystalline polyester resin (A).

Here, the flow beginning temperature is a temperature at which the melt viscosity measured by a capillary rheometer having a nozzle with an inner diameter of 1 mm and a length of 10 mm becomes 48,000 poise in the case where a heat melted polymer is extruded out the nozzle at a temperature increasing speed of 4° C./min under a load of 100 kg/cm$^2$.

In the case where the flow beginning temperature of the liquid crystalline polyester resin (A) is lower than 300° C., the heat resistance may become insufficient, and in the case the flow beginning temperature exceeds 400° C., the molding process may become difficult and a molded article having good appearance may not be obtained due to the thermal decomposition of liquid crystalline polyester resins.

In cases where the flow beginning temperature of the liquid crystalline polyester resin (B) is lower than 260° C., the heat resistance may not be sufficient, and in cases where the flow beginning temperature exceeds 350° C., the fluidity improving effect may be deteriorated.

Further in the cases where the difference of the flow beginning temperature of the liquid crystalline polyester resin (B) from the flow beginning temperature of the liquid crystalline polyester resin (A) is less than 20° C., the fluidity of the liquid crystalline polyester resin mixture may become insufficient and in the case it exceeds 60° C., the liquid crystalline polyester resin (B) with a low flow beginning temperature may be easily deteriorated.

The mixing ratio of the liquid crystalline polyester resin (B) to 100 parts by weight of the liquid crystalline polyester resin (A) is 10 to 150 parts by weight. In the case where it is less than 10 parts by weight, the fluidity improving effect is deteriorated and in the case where it is more than 150 parts by weight, the heat resistance is decreased.

The fibrous inorganic filler to be used for the present invention is preferable to have an average fiber diameter of 0.1 to 20 μm, more preferably 0.5 to 15 μm. In the case where the average fiber diameter is smaller than 0.1 μm, the effect to suppress the degree of warpage and improve the heat resistance may become insufficient. In the case where the average fiber diameter is larger than 20 μm, the fluidity and the effect to decrease the degree of warpage may not be sufficient.

The average fiber length is preferably 1 to 300 μm, more preferably 5 to 300 μm. Further, in the case where the average length is shorter than 1 μm, the effect to increase the heat resistance and the mechanical strength may become insufficient. Meanwhile, in the case where the average length is longer than 300 μm, the effect to improve the fluidity may become insufficient.

The fibrous inorganic filler include, for example, glass fiber, carbon fiber, wallastonite, aluminum borate, potassium titanate whisker, however it is not limited to these examples.

They may be used alone or in combination of two or more of them.

The plate-shaped inorganic filler used for the present invention is an inorganic material which has a plane-laminar crystalline structure due to chemical bonds and laminar bonding each other by van der Waals' force, so that it easily causes cleavage and becomes like a plate from a particle form at the time of pulverization.

The average particle diameter of the plate-shaped inorganic filler used for the present invention is preferably 1 to 20 μm, more preferably 5 to 20 μm. In the case the average particle diameter is smaller than 1 μm, the suppression of the degree of warpage may become insufficient. Meanwhile, in the case where the average particle diameter is larger than 20 μm, the suppression of the degree of warpage is not so much different from that in the case it is 20 μm or smaller, however the appearance of a formed product may be deteriorated.

The plate-shaped inorganic filler include, for example, talc, mica, graphite and the like, however it is not limited to these examples. They may be used alone or in combination of two or more of them.

The liquid crystalline polyester resin composition of the present invention for a connector is obtained by mixing a fibrous and/or plate-shaped inorganic filler with liquid crystalline polyester resin mixture described above.

The addition amount of the fibrous and/or plate-shaped inorganic filler to 100 parts by weight of the liquid crystalline polyester resin mixture is from 15 to 180 parts by weight, preferably from 20 to 150 parts by weight. In the case where the addition amount of the fibrous and/or plate-shaped inorganic filler is less than 15 parts by weight, the suppression of the degree of warpage may be insufficient and in the case where the fibrous and/or plate-shaped inorganic filler is more than 180 parts by weight, the fluidity may becomes insufficient and resulting in causing significant abrasion of a cylinder and molds of a molding apparatus.

To the extent within which the object of the present invention are not interfered, the liquid crystalline polyester resin composition of the present invention for a connector may contain one or more kinds of commonly used additives, that is, a release improving agent such as fluororesin and metal soaps and the like; a coloring agent such as dyes and pigments; an antioxidant; a thermal stabilizer; a UV absorbing agent; an antistatic agent; a surfactant and the like. Further, one or more kinds of substances having an externally lubricating effect, for example, a higher fatty acid, a higher fatty acid ester, a higher fatty acid metal salt, a fluorocarbon type surfactant and the like may be added.

Further, a slight amount of one or more kinds of thermoplastic resins, for example, polyamide, polyester, polyphenylene sulfide, polyether ketone, polycarbonate, polyphenylene ether and its modified compound, polysulfone, polyether sulfone, polyether imide and the like and a slight amount of one or more kinds of thermosetting resin, for example, phenol resin, epoxy resin, polyimide resin and the like may be also added.

The mixing methods for producing the liquid crystalline polyester resin composition of the present invention is not particularly limited. The liquid crystalline polyester resin mixtures, a fibrous and/or plate-shaped inorganic filler and, if necessary, additives such as the release improving agent, the thermal stabilizer and the like may be separately supplied to a melting and mixing apparatus or these materials may be preliminarily mixed by using a crucible, a Henschel mixer, a ball mill, a ribbon blender and the like and then supplied to the melting and mixing apparatus.

A connector can be obtained by molding the liquid crystalline polyester resin composition thus obtained.

The molding method may include, for example, an injection molding.

The molding temperature is preferably a temperature higher than the flow beginning temperature of the liquid crystalline polyester resin composition by 10° C. to 80° C. If it is lower than the above-mentioned temperature, the fluidity may decrease extremely and result in deterioration of molding property and if it is higher, the resins are deteriorated considerably and it possibly results in inferior characteristics of the connector.

EXAMPLES

Hereinafter, the invention will be described with the reference to examples, however the present invention is not limited to these examples.

(1) Degree of Warpage

Using a connector mold illustrated in FIG. 1, molding was carried out by an injection molding apparatus (UH1000; manufactured by Nissei Resin Industry Co., Ltd.) at a cylinder temperature of 350° C., a mold temperature 70° C., and an injection speed of 100 mm/s. After that, the taken out molded product was put on a surface plate and the height from the surface plate was measured by a micrometer for each 1 mm from a gate to an opposed gate and setting the position in the gate side as a standard face, the displacement from the standard face of the respective standard values was measured. The degree of warpage was calculated by least square method program and the obtained maximum value was employed as the degree of warpage of each molded product and the average value of the degree of warpage of five molded products was defined as the degree of warpage of the invention.

(2) Flexural Modulus

Using an injection molding apparatus (PS40E5ASE; manufactured by Nissei Resin Industry Co., Ltd.), a rod-like specimen with a width of 12.7 mm, a length of 127 mm, and a thickness of 6.4 mm was molded at a cylinder temperature of 350° C., a mold temperature 130° C., and an injection speed of 50% and subjected to flexural modulus measurement according to ASTM D790.

(3) Thin Wall Flow Length

Figure 2:
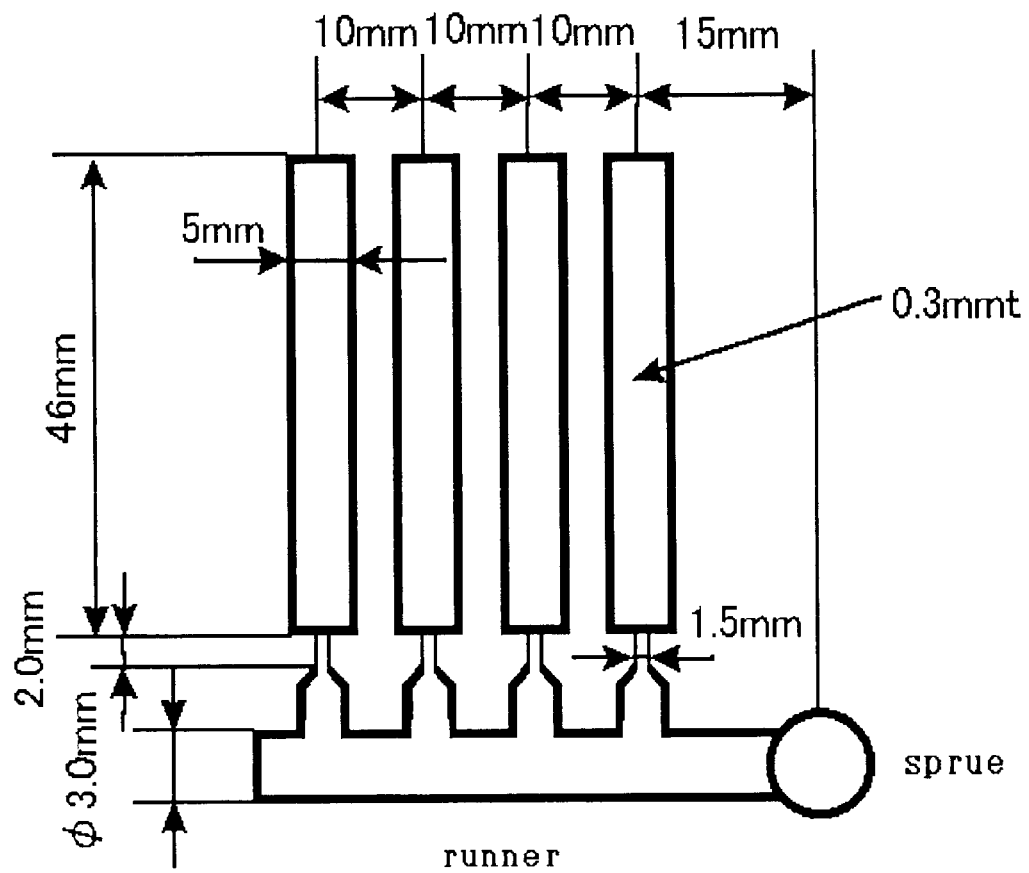
FIG. 2: An illustration of a mold for measuring the thin wall flow length.

Using a mold for measuring thin wall flow length illustrated in FIG. 2, molding was carried out by an injection molding apparatus (PS10E1ASE; manufactured by Nissei Resin Industry Co., Ltd.) at a cylinder temperature of 350° C., a mold temperature 130° C., and an injection speed of 60%. Molded products were taken out and the length of four cavity portions of each molded product was measured and the average measured values of five molded products were defined as the thin wall flow length.

Production Example 1

A reactor equipped with a stirring apparatus, a torque meter, a nitrogen gas introducing pipe, a thermometer, and a refluxing cooling apparatus was charged with 994.5 g (7.2 mole) of p-hydroxybenzoic acid, 446.9 g (2.4 mole) of 4,4'-dihydroxybiphenyl, 299.0 g (1.8 mole) of terephthalic acid, 99.7 g (0.6 mole) of isophthalic acid and 1347.6 g (13.2 mole) of acetic anhydride. After the inside gas of the reactor was sufficiently replaced with nitrogen gas, it was increased to 150° C. in 30 minutes under nitrogen gas circulation and then while keeping at the temperature, the reflux was continued for 3 hours.

After that, 2.4 g of 1-methylimidazole was added and then while removing distilled byproduct, acetic acid, and unreacted acetic anhydride by distillation, the temperature was increased to 320° C. in 2 hours and 50 minutes and the time when the torque increase was found was assumed to be the reaction finishing time and the resulting products were recovered. The obtained solid product was cooled to a room temperature and pulverized by a coarse pulverizer and after that, in nitrogen atmosphere, the pulverized product was heated to 250° C. from the room temperature in 1 hour, to 295° C. from 250° C. in 5 hours, and kept at 295° C. for 3 hours to promote solid phase polymerization reaction to obtain LCP1. The flow beginning temperature of the LCP1 was 326.6° C.

Production Example 2

Reaction was carried out in the same manner as the Production Example 1, except that 1-methylimidazole was not added and then products were recovered. After that, the obtained solid product was cooled to a room temperature and pulverized by a coarse pulverizer and after that, in nitrogen atmosphere, the pulverized product was heated to 250° C. from the room temperature in 1 hour, to 285° C. from 250° C. in 5 hours, and kept at 285° C. for 3 hours to promote solid phase polymerization reaction to obtain LCP2. The flow beginning temperature of the LCP2 was 323.5° C.

Production Example 3

A reactor equipped with a stirring apparatus, a toque meter, a nitrogen gas introducing pipe, a thermometer, and a refluxing cooling apparatus was charged with 994.5 g (7.2 mole) of p-hydroxybenzoic acid, 446.9 g (2.4 mole) of 4,4'-dihydroxybiphenyl, 239.2 g (1.44 mole) of terephthalic acid, 159.5 g (0.96 mole) of isophthalic acid and 1347.6 g (13.2 mole) of acetic anhydride. After the inside gas of the reactor was sufficiently replaced with nitrogen gas, it was increased to 150° C. in 30 minutes under nitrogen gas circulation and then while keeping at the temperature, the reflux was continued for 3 hours.

After that, 2.4 g of 1-methylimidazole was added and then while removing distilled byproduct, acetic acid, and unreacted acetic anhydride by distillation, the temperature was increased to 320° C. in 2 hours and 50 minutes and the time when the torque increase was found was assumed to be the reaction finishing time and the resulting products were recovered. The obtained solid product was cooled to a room temperature and pulverized by a coarse pulverizer and after that, in nitrogen atmosphere, the pulverized product was heated to 220° C. from the room temperature in 1 hour, to 240° C. from 220° C. in 0.5 hours, and kept at 240° C. for 10 hours to promote solid phase polymerization reaction to obtain LCP3. The flow beginning temperature of the LCP3 was 285.7° C.

Production Example 4

Reaction was carried out in the same manner as the Production Example 3, except that 1-methylimidazole was not added and then the products were recovered. After that, the obtained solid product was cooled to a room temperature and pulverized by a coarse pulverizer and after that, in nitrogen atmosphere, the pulverized product was heated to 220° C. from the room temperature in 1 hour, to 245° C. from 220° C. in 0.5 hours, and kept at 245° C. for 10 hours to promote solid phase polymerization reaction to obtain LCP4. The flow beginning temperature of the LCP4 was 285.0° C.

Examples 1 and 2, Comparative Examples 1 and 2

The respective components were mixed as shown in Table 1 and then granulated by a biaxial extruder (PCM-30; manufactured by Ikegai Tekkou Co., Ltd.) at a cylinder temperature of 340° C. to obtain liquid crystalline polyester resin compositions. Each obtained liquid crystalline polyester resin composition was molded and subjected to the measurement by the above-mentioned methods (1) to (3). The results were shown in Table 2.

TABLE 1

|  | Example 1 | Example 2 | Comparative Example 1 | Comparative Example 2 |
| --- | --- | --- | --- | --- |
| LCP1 (wt %) | 33 | 33 | — | — |
| LCP2 (wt %) | — | — | 33 | 33 |
| LCP3 (wt %) | 27 | 27 | — | — |
| LCP4 (wt %) | — | — | 27 | 27 |
| Milled GF (wt %) | 27 | — | 27 | — |
| Chopped GF (wt %) | — | 27 | — | 27 |
| Talc (wt %) | 13 | 13 | 13 | 13 |

Milled GF: EFDE 50-01 (manufactured by Central Glass Co., Ltd.)
Chopped GF: CS03JAPx-01 (manufactured by Asahi Fiber Glass Co., Ltd.)
Talc: X-50 (manufactured by Hayashi Kasei Co., Ltd.)

TABLE 2

|  | Example 1 | Example 2 | Comparative Example 1 | Comparative Example 2 |
| --- | --- | --- | --- | --- |
| Degree of warpage (mm) | 0.043 | 0.072 | 0.056 | 0.083 |
| Flexural modulus (MPa) | 12100 | 12000 | 12900 | 12500 |
| Thin wall flow length (mm) | 31.0 | 28.1 | 27.0 | 22.8 |

The present invention can provide a liquid crystalline polyester resin composition excellent in fluidity and having suppressed amount of warpage and therefore suitable for a connector.

What is claimed is:

1. A liquid crystalline polyester resin composition for connector comprising 100 parts by weight of a liquid crystalline polyester resin mixture which comprises 100 parts by weight of a liquid crystalline polyester (A) having a flow beginning temperature of from 300° C. to 400° C. and from 10 to 150 parts by weight of a liquid crystalline polyester resin (B) having a flow beginning temperature of 260° C. to 350° C. and the difference between the flow beginning temperature of the liquid crystalline polyester resin (A) and the flow beginning temperature of the liquid crystalline polyester resin (B) is from 20° C. to 60° C., and from 15 to 180 parts by weight of a fibrous and/or plate-shaped inorganic filler; wherein both of the liquid crystalline polyester resin (A) and the liquid crystalline polyester resin (B) are produced by ester exchange reaction between at least one selected from a group consisting of aromatic dicarboxylic acids and aromatic hydroxycarboxylic acids, and an acylated compound obtained by acylation of phenolic hydroxyl group of at least one selected from a group consisting of aromatic diols and aromatic hydroxycarboxylic acids with a fatty acid anhydride, and at least one of the acylation and the ester exchange reaction is carried out in the presence of a heterocyclic organic basic compound having two or more nitrogen atoms.

2. The liquid crystalline polyester resin composition according to claim 1, wherein the heterocyclic organic basic compound having two or more nitrogen atoms is imidazole compound represented by the formula (1),

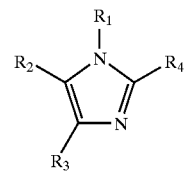

(1)

wherein, $R_1$ to $R_4$ independently represent hydrogen atom, an alkyl with 1 to 4 carbons, hydroxymethyl, cyano, a cyanoalkyl with 2 to 5 carbons, a cyanoalkoxyl with 2 to 5 carbons, carboxyl, amino, an aminoalkyl with 1 to 4 carbons, an aminoalkoxy with 1 to 4 carbons, phenyl, benzyl, phenyipropyl or formyl.

3. The liquid crystalline polyester resin composition according to claim 1, wherein the aromatic diols is 4,4'-dihydroxybiphenyl, aromatic hydroxycarboxylic acid is p-hydroxy benzoinc acid and the aromatic dicarboxylic acid is terephthalic acid, isophthalic acid, or a mixture of terephthalic acid and isophthalic acid.

4. The liquid crystalline polyester resin composition according to claim 3, wherein both of the liquid crystalline polyester resin (A) and the liquid crystalline polyester resin (B) comprise a structural repeating unit (I) derived from p-hydroxybenzoic acid, a structural repeating unit (II) derived from 4,4'-dihydroxybiphenyl, a structural repeating unit (III) derived from terephthalic acid, and a structural repeating unit (IV) derived from isophthalic acid.

5. The liquid crystalline polyester resin composition according to claim 4, wherein a mole ratio of II/I is in a range of 0.2 to 1.0, a mole ratio of (III+IV)/II is in a range of 0.9 to 1.1, and a mole ratio of IV/III is in a range not lower than 0 to not higher than 1.

6. The liquid crystalline polyester resin composition according to claim 5, wherein a ratio of the mole ratio of IV/III ($\alpha$) of liquid crystalline polyester resin (A) to the mole ratio of IV/III ($\beta$) of liquid crystalline polyester resin (B) ($\alpha/\beta$) is in the range of 0.1 to 0.6.

7. The liquid crystalline polyester resin composition according to claim 1, wherein the fibrous inorganic filler is at least one selected from the group consisting of glass fiber, carbon fiber, wallastonite, aluminum borate, potassium titanate whisker.

8. The liquid crystalline polyester resin composition according to claim 1, wherein the plate-shaped inorganic filler is at least one selected from the group consisting of talc, mica and mixture of talc and mica.

9. A connector obtained by using the liquid crystalline polyester resin composition according to any one of claims 1 to 8.

* * * * *